US007007183B2

(12) United States Patent
Rawson, III

(10) Patent No.: US 7,007,183 B2
(45) Date of Patent: Feb. 28, 2006

(54) POWER CONSERVATION BY TURNING OFF POWER SUPPLY TO UNALLOCATED RESOURCES IN PARTITIONED DATA PROCESSING SYSTEMS

(75) Inventor: Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 10/314,862

(22) Filed: Dec. 9, 2002

(65) Prior Publication Data

US 2004/0111596 A1    Jun. 10, 2004

(51) Int. Cl.
    *G06F 1/32* (2006.01)
(52) U.S. Cl. ..................................... 713/324; 713/320
(58) Field of Classification Search ................ 713/300, 713/310, 320, 324; 709/221, 223, 226
See application file for complete search history.

(56) References Cited

U.S. PATENT DOCUMENTS

| | | | | |
|---|---|---|---|---|
| 5,574,914 A | * | 11/1996 | Hancock et al. | 712/220 |
| 5,784,702 A | | 7/1998 | Greenstein et al. | |
| 6,260,068 B1 | * | 7/2001 | Zalewski et al. | 709/226 |
| 6,279,046 B1 | * | 8/2001 | Armstrong et al. | 710/5 |
| 6,519,660 B1 | * | 2/2003 | Rooney | 710/38 |
| 6,633,916 B1 | * | 10/2003 | Kauffman | 709/229 |
| 6,684,343 B1 | * | 1/2004 | Bouchier et al. | 714/4 |
| 6,701,360 B1 | * | 3/2004 | Diesing et al. | 709/223 |
| 6,725,317 B1 | * | 4/2004 | Bouchier et al. | 710/312 |
| 6,820,207 B1 | * | 11/2004 | Dawkins et al. | 713/324 |
| 6,898,727 B1 | * | 5/2005 | Wang et al. | 714/4 |

FOREIGN PATENT DOCUMENTS

| CN | 1295272 A | | 5/2001 |
|---|---|---|---|
| JP | 2002-41304 | * | 2/2002 |

* cited by examiner

*Primary Examiner*—Chun Cao
(74) *Attorney, Agent, or Firm*—Joseph P. Lally; Casimer K. Salys

(57) ABSTRACT

A power-aware, logically partitioned data processing system and corresponding method of use include a set of physical resources and a hypervisor. The hypervisor creates partitions and allocates at least some of the physical resources to the partitions. The system further includes means for reducing the power consumption of any physical resources not allocated to a partition. The hypervisor may allocate physical resources to the partitions to maximize the number of unallocated physical resources. The physical resources may include processors and the hypervisor may allocate a fractional portion of at least one processor to a partition. In this embodiment, the system may reduce power consumption by scaling the supply voltage or clocking frequency to the fractionally allocated processor. The resources may include memory modules and the hypervisor may dynamically reduce the allocated memory and power consumption by minimizing the number of memory modules needed to support the memory allocated to the partitions. The resources may also include disks provided through a storage-area network (SAN). This SAN may be partitioned in the same manner as the main data processing system, and the SAN partitioning may turn off power to unallocated or unused disk drives to reduce power consumption.

20 Claims, 4 Drawing Sheets

POWER CONSERVATION BY TURNING OFF POWER SUPPLY TO UNALLOCATED RESOURCES IN PARTITIONED DATA PROCESSING SYSTEMS

BACKGROUND

1. Field of the Present Invention

The present invention generally relates to the field of data processing systems and more particularly to energy consumption conservation in partitioned data processing systems.

2. History of Related Art

In the field of data processing systems, the demand for server consolidation solutions is growing. Driven by corporate efforts to reduce hardware costs, server consolidation includes tools that enable systems administrators to run multiple applications and, significantly, operating systems in isolation on a single server. Employing server consolidation concepts, an enterprise could consolidate applications and services that it currently deploys on multiple servers thereby eliminating the need for large numbers of server boxes. Consolidation is facilitated by the related concepts of virtualization and partitioning. Both have existed on mainframe computers for years, but are now becoming increasingly demanded and increasingly viable options for Unix and Intel platforms.

Logical partitioning refers to the ability to make a single multiprocessor system behave as if it were two or more independent systems. Each logical partition (LPAR) represents a division of resources within the system. Each partition is "logical" because the division of resources is not necessarily tied to physical, hardware-defined boundaries within a system although some machines, the IBM xSeries 440 for example, have some type of modular construction where several machines that could be standalone systems are tightly connected into a larger system. The primary resources in a typical system include its processors, main storage (system storage), I/O buses, and I/O adapters (IOA's). Each logical partition is configured to operate as an independent logical system, but each partition may share physical system attributes such as the system serial number, system model, and processor feature code. Other system attributes may vary among partitions. For example, each partition in a conventionally implemented LPAR has dedicated hardware such as processors, main storage, and I/O devices. For information on LPAR implementation details, the reader is referred to *Slicing the AS/400 with Logical Partitioning: A How to Guide* (SG24-5439-00) and *Capacity Planning for Logical Partitioning on the IBM iSeries Server* (SG24-6209-00), which are both available as IBM Redbooks (www redbooks ibm com).

Logically partitioned systems are gaining in popularity as a means for implementing a server consolidation strategy. Logically partitioning a system's resources (processors, memory, disk storage and other I/O devices, and so forth) enables logical isolation of software such that, for example, each partition runs its own operating system (OS). Logical partitions also have some hardware fault tolerance if configured properly. Interactive and batch workloads that may not run well together on a single machine can be isolated and run more efficiently in separate partitions. Similarly, production and test environments can be implemented on a single physical system. Thus, a customer can consolidate several systems into one system with logical partitions thereby eliminating the need for and expense of additional hardware.

Historically, LPAR systems were more or less static meaning that the resources assigned to a particular partition did not vary over time unless a complete reconfiguration (typically including a system boot) was performed. LPAR systems typically employ low level software, alternatively referred to as a virtual machine monitor or a hypervisor that is responsible for managing the various partitions including the resources available to each partition. Developments in hypervisor code have led to the emergence of dynamic logical partitioning (DLPAR) systems.

Concurrent with the increasing emphasis on consolidation, enterprises are also becoming increasingly cognizant of operating costs and, more specifically, the energy consumption costs associated with information technology infrastructure. Historically, the goal of reducing server operating costs has received a low priority relative to the goals of performance (low latency and high throughput), reliability, availability, and security. As enterprises continue to pack computational capability into increasingly dense configurations, however, energy consumption and the resulting heat dissipation have become important not just from a cost perspective, but also from performance and reliability perspectives as well.

It would be desirable, therefore, to incorporate power awareness functionality into the hypervisor used on server systems supporting logical partitioning.

SUMMARY OF THE INVENTION

The identified problem is addressed by a power-aware, virtualized data processing system and corresponding method of use according to the present invention. The disclosed system includes a set of physical resources and a hypervisor. The hypervisor creates logical partitions and allocates at least some of the physical resources to the partitions. The system is able to reduce the power consumed by physical resources not allocated to any partition. The hypervisor may allocate physical resources to the logical partitions to maximize the number of unallocated physical resources. The physical resources may include processors and the hypervisor may allocate a fractional portion of at least one processor to a partition. In this embodiment, the system may reduce power consumption by scaling the supply voltage or clocking frequency to the fractionally allocated processor. The resources may include memory modules and the hypervisor may assign these modules to partitions in such a way as to minimize the number of modules allocated or assigned to active partitions. The resources may also include a set of storage disks configured, for example, as a storage area network (SAN) connected to the data processing system. In this embodiment, energy conservation could be pursued by logically partitioning the SAN to reflect the logical partitions of the data processing system and powering down disks not allocated to any of the SAN partitions as well as those allocated to inactive partitions.

BRIEF DESCRIPTION OF THE DRAWINGS

Other objects and advantages of the invention will become apparent upon reading the following detailed description and upon reference to the accompanying drawings in which.

Figure 1:
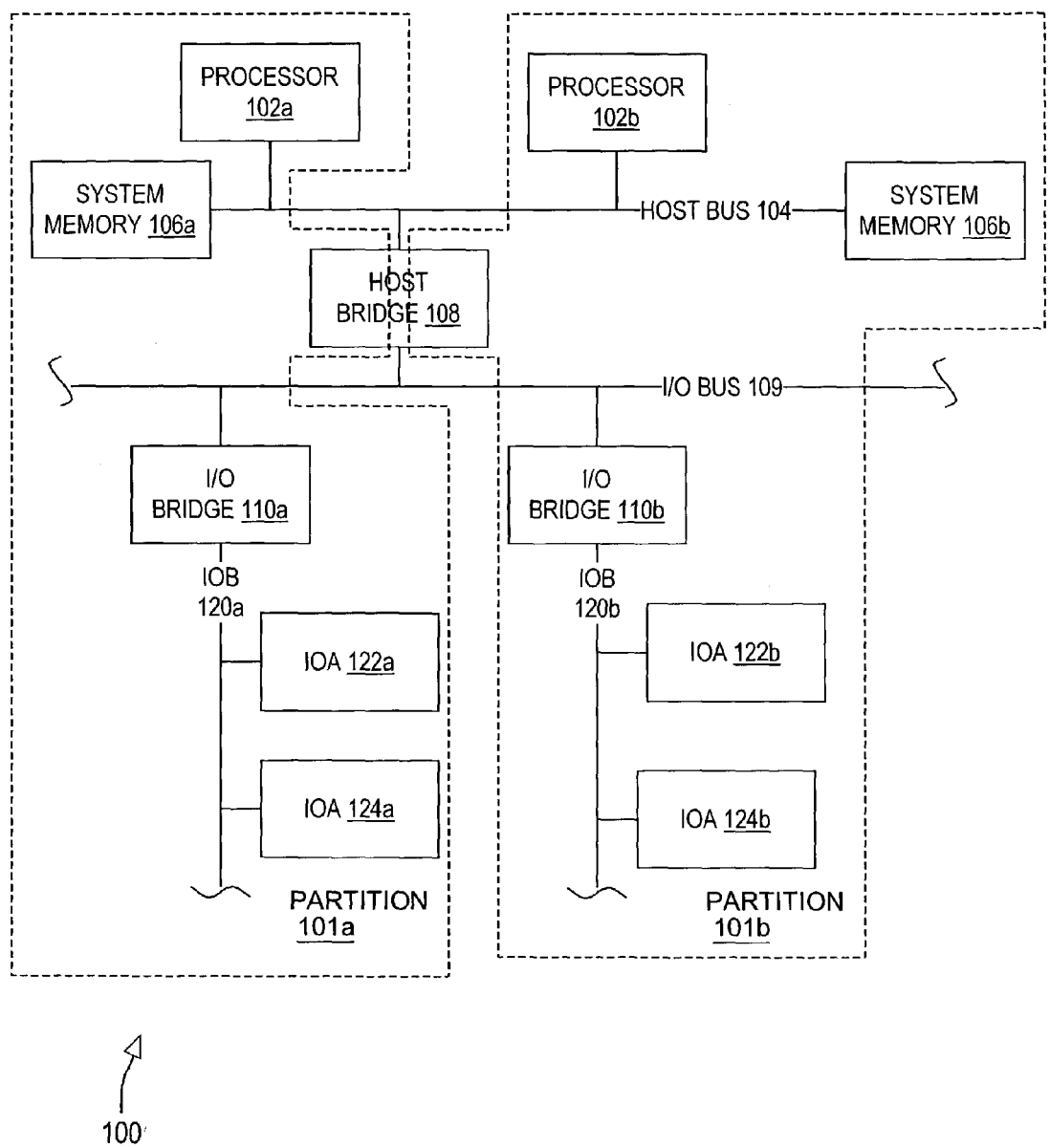
FIG. 1 is a block diagram of selected elements of a conventional, logically partitioned data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a method and system for minimizing power consumption in a virtualized or logically partitioned machine system by incorporating power awareness into the virtual machine system's hypervisor or analogous supervisory software. The hypervisor would preferably monitor and allocate system resources to logical partitions based, at least in part, upon the number of discrete physical resources required to implement the desired partitions. When a particular partitioning could be implemented with, for example, either two physical resources or three physical resources, the two resource implementation would be selected (all other considerations being equal). This allocation philosophy is referred to herein as "resource packing" or simply "packing." The selected resources would then be allocated to the various partitions. The hypervisor could then reduce power consumption by powering down unallocated system resources.

In one implementation, the system maximizes the amount of unallocated resources (thereby maximizing the potential energy consumption savings) by employing fractional resource allocation in which two or more partitions share portions of a common physical resource and packing the allocated fractional resources into as few physical components as possible. Using fractional resource allocation and packing consistent with the present invention, for example, a first partition requiring 0.5 "units" of a physical resource and a second partitioning requiring 1.5 units, could be allocated to just two physical resources. All unallocated physical resources could then be transitioned to a low power state to minimize energy consumption.

The physical resources in typical systems that are among the most likely candidates for consideration in a power-aware LPAR system include the system's main memory, processors, and storage subsystems. These resources are of particular interest because, generally speaking, they are relatively abundant resources and relatively expensive in terms of power costs to operate. Processors, main memory, and storage capacity represent relatively abundant resources because the capacity of these resources frequently exceeds the requirements of any particular application. If the application is isolated from other applications using logical partitioning, it would be undesirable from a power-awareness perspective to allocate more physical resources to the partition than the application requires.

In addition, when server consolidation occurs, an LPAR system may be partitioned with a partition for each of the systems that it replaces. In many cases, especially where the workload varies in type and/or intensity over a day, week, or month, some partitions may be or become inactive. In many cases, such partitions may have no operating system running in them. Under the present invention, resources assigned to these inactive partitions may be turned off. If partitions are deleted due to low workload, as an example, a pool of unallocated resources remains and these resources may also be turned off.

In addition to being relatively abundant, memory, processor, and storage resources are also relatively expensive to operate because they tend to draw significant amounts of current even during times of low activity. Main memory, for example, is typically implemented with some form of volatile random access memory to which a constant current must be supplied to maintain its contents. Similarly, general purpose processors are notorious for consuming large amounts of power and dissipating large amounts of heat. For these reasons, the description below will illustrate power aware concepts of the present invention with reference to these particular resources. It should be noted, however, that other system resources, such as I/O adapters, may be amenable for incorporation into the following discussion.

Before discussing novel elements of the invention, a brief introduction to logically partitioned data processing system is presented. Turning to the drawings, FIG. 1 is a block diagram of selected elements of a data processing system 100 employing a traditional logical partitioning scheme. In the depicted embodiment, system 100 includes multiple general purpose microprocessors including a first processor 102a and a second processor 102b (generically or collectively referred to as processor(s) 102). Processors 102 are connected to a system memory modules 106a and 106b (generically or collectively referred to as system memory 106) via a host bus 104. System memory 106 is typically implemented with a high-density, volatile storage technology such as DRAM.

A host bridge 108 provides an interface between host bus 104 and an I/O bus 109. I/O bus 109 is representative of any standardized peripheral bus including as an example, a Peripheral Components Interface (PCI) bus well known in the field of microprocessor-based data processing system design. The depicted embodiment of system 100 uses I/O bus 109 as a "primary" I/O bus that is connected to first and second secondary I/O busses 120a and 120b through a pair of I/O bridges 110a and 110b. Attached to each I/O bus 120 are peripheral devices or I/O adapters (IOA's) identified by reference numerals 122a, 124a, 122b, and 124b. These peripheral devices may represent any of a variety of peripheral devices including as examples, graphics adapters, disk controllers, and network adapters.

System 100 is logically partitioned into two partitions, 101a and 101b. In the partitioning depicted in FIG. 1, system resources such as processors 102, I/O busses 120, and IOA's 122 are dedicated to either first partition 101a or second partition 101b. In other partitioning schemes, the processors, memory and storage resources may be logically split among a number of partitions. Modern partitioning schemes also generally allow at least the re-definition of the partitions without doing a system-wide reset. However, the partitioning of system 100 is typically done without regard to power consumption. The power-aware, logical partitioning mechanism, according to the present invention, addresses this drawback.

Figure 2:
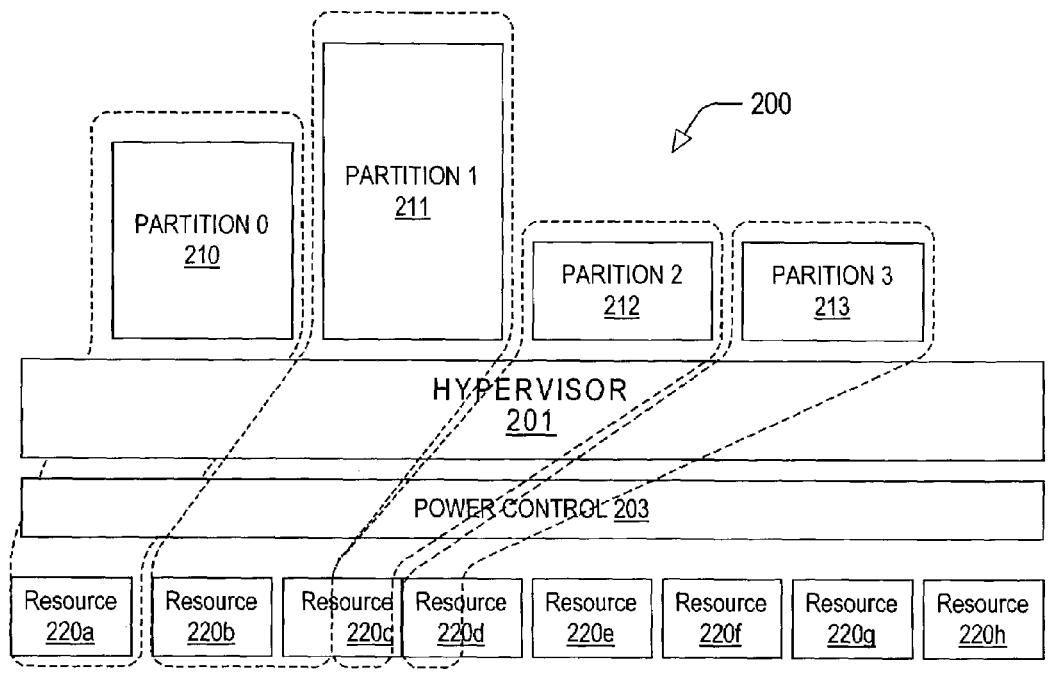
FIG. 2 is a conceptualized illustration of selected elements of a power-aware, logically partitioned system according to one embodiment of the invention.
Figure 3:
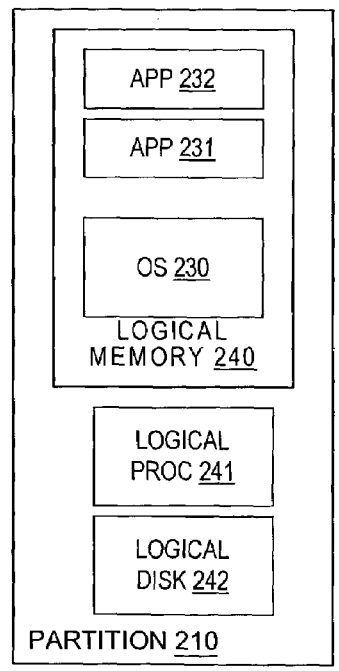
FIG. 3 is a block diagram of selected elements of a partition in the logically partitioned system of FIG. 2.

Referring now to FIG. 2 and FIG. 3, a conceptualized depiction of a virtual machine system 200 according to one embodiment of the present invention is disclosed. In the depicted embodiment, system 200 includes four logical partitions 210–213, a hypervisor 201, and system resources 220a through 220h. As shown in FIG. 3, partition 210 includes logical resources including a logical memory 240, a logical processor 241, and logical I/O adapter identified as logical disk 242. Logical memory 240 contains or includes an operating system 230 and one or more applications 231 and 232.

Hypervisor 201 is typically implemented as a computer executable instructions (software) stored on a computer readable medium such as main memory, cache memory, disk storage, ROM storage, flash memory, and the like. Hypervisor 201 is suitable for partitioning a data processing system such as a symmetric multi-processor (SMP) server system into independent and logically distinct partitions.

Hypervisor 201 according to the present is configured to map logical partitions and their corresponding logical resources to the system's physical resources 220a through 220h (referred to collectively or generically as 220). In addition, the preferred embodiment of hypervisor 201 is enabled to map the logical resources of partitions 210 to 213 to the minimum subset of the resources 220 required to provision all of the partitions. In this embodiment, hypervisor 201 may include additional functionality to control power and/or performance settings for resources 220. After hypervisor 201 has mapped partitions 210 through 213 to a minimized subset of the physical resources 220, hypervisor 201 may implement a power consumption reduction policy by powering down or scaling down power to one or more of the physical resources 220 that have been unallocated.

FIG. 2 illustrates an exemplary system in which hypervisor 201 has defined four partitions. Partitions 210 through 213 have differing sizes to reflect the computation resources required by the partition. Thus, partition 211 is illustrated as approximately 50% larger than partition 210 to reflect the computational resources required by partition 211 are roughly 1.5 times the computational resources required by partition 211. Hypervisor 201 reflects the varying computational requirements of each partition by allocating and mapping physical resources to the logical partition based, at least in part, upon the respective computational requirements of the partitions. These allocations may be done in conjunction with configuration definitions provided by the administrator of the system. Thus, partition 0 (210) is shown as mapped (as indicated by the dashed lines) to a single and entire physical resource 220a while partition 1 (211) is shown as mapped to all of resource 220b and to a fractional portion approximating 50% of resource 220c.

As implied by the foregoing illustration, hypervisor 201 incorporates fractional resource support such that physical resources may be shared among multiple logical partitions. The fractional allocation of physical resources in the case of memory is relatively easy to conceptualize because memories are configured as arrays of fungible elements (memory cells). Hypervisor 201 according to the present invention is enabled to support fractional resource division for resources other than main memory. In one embodiment suitable for minimizing processor power consumption, hypervisor 201 includes fractional processor support wherein a single physical processor is shared by two or more logical partitions. A fractional processor is typically achieved by time-sharing a processor among multiple partitions. In this type of implementation, a first partition will "own" the processor for a first time-slice, a second processor for a second time slice, and so forth. In some embodiments, a processor may even be split into units of less than 1%. System 200 is implemented as a dynamic LPAR system. In such a system, hypervisor 201 may periodically (or asynchronously) evaluate the current allocation of resources and may update or alter the resource allocation at that time. Such updates typically are performed relatively infrequently (on the order of minutes, for example) because of the performance penalty associated with frequent partition re-configurations. Because partitions are reallocated infrequently, hypervisor may implement relatively complex algorithms to allocate resources. Power-aware partitioning could be formulated as a constrained linear optimization problem or as a bin-packing problem.

Figure 4:
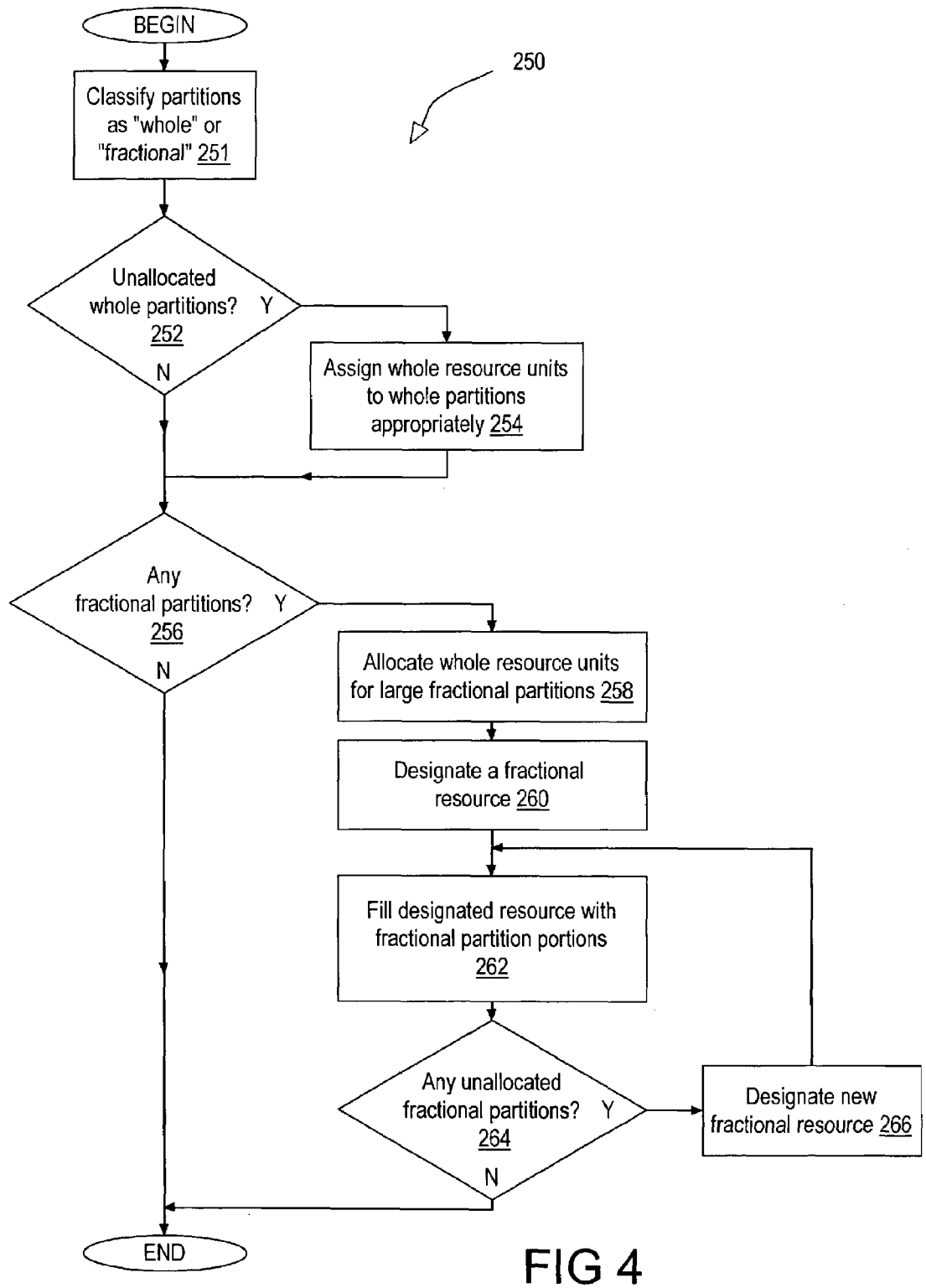
FIG. 4 is a flow diagram of a method of allocating physical resources to a logical partition to facilitate an energy consumption policy according to one embodiment of the present invention.

In an embodiment illustrated by the flow diagram of FIG. 4, system 200 may perform a method 250 to pack its partitions in the smallest quantity of physical resources by first classifying (block 251) all partitions as requiring either a whole number of resources or a fractional number of resources. (The fractional resource classification would include those partitions requiring a non-integer number of resources whether the number is greater than or less than 1.) For each partition classified as a whole partition (block 252), the hypervisor would allocate (block 254) the physical resources appropriately by simply assigning one or more whole resources to the partition. After allocating the whole partitions, the hypervisor would determine (block 256) if the system has any fractional partitions. If the system has large fractional partitions (a fractional partition requiring greater than 1 unit of a physical resource such as a fractional partition requiring 1.5 resource units), the hypervisor would first allocate (block 258) resources to accommodate the integer portions of these large fractional partitions. Thereafter, the hypervisor would designate (block 260) a resource as the current fractional resource and fill the designated resource (block 262) with the fractional portions of the fractional partitions. If, after filling the currently designated resource, additional unallocated fractional partitions remain (block 264), a new resource is designated (block 266) and filled until all of the fractional partitions have been allocated. In this manner, the hypervisor packs the fractional partition portions into a minimum number of physical resources.

In addition to the resource allocation methodology described above, hypervisor 201 is configured to reduce the power consumed and heat dissipated by system 200 by determining or tracking which of the physical resources 220 (FIG. 2) are unallocated or less than fully allocated and taking action to reduce the power consumed by less than fully allocated resources. Thus, FIG. 2 illustrates hypervisor 201 as including or interfaced to a power control unit 203 that controls the power consumption state of resources 220.

Power control unit 203 is preferably enabled to control the supply voltage (or voltages) applied to resources 220. In the case of a completely unallocated resource such as resources 220e to 220h in FIG. 2, power control unit 203 is likely configured to power off the resource off entirely thereby reducing the energy consumption to 0. In the case of a partially allocated resource such as resource 220d in FIG. 2, power control unit 203 may be enabled to reduce the power consumption by appropriate voltage scaling if supported by the corresponding resource. Processors, for example, may allow voltage scaling to reduce power consumption when the full computational power of the processor (measured, for example, in operations executed per second) is not needed. In addition, processors and other resources may support reduced energy consumption by permitting the use of a slower clocking frequency. In resources that do support slower clocking frequencies, power control unit 203 may scale down the voltage, reduce the clocking frequency, or a combination of both to achieve power consumption reduction for partially allocated processor resources.

In embodiments where resources 220 represent physical memory modules, hypervisor 201 may incorporate techniques to dynamically alter the number of physical resources allocated at any given time. Specifically, hypervisor 201 is preferably configured to group the physical page frames that it allocates to a particular partition onto the smallest set of physical memory modules possible. In addition, hypervisor 201 is preferably configured to monitor physical page accesses and to nominate, under specified conditions, one or more physical pages that are candidates for "deallocation." The hypervisor could, for example, nominate physical pages that have not been accessed within a specified time period for deallocation. Another embodiment of hypervisor 201 could employ a least recently used (LRU) approach to page deallocation. After nominating a page or pages for deallocation, the hypervisor could then deallocate the page by saving the page data to disk storage. In this manner, the hypervisor could potentially reduce over time the number of physical pages required to support a partition. If the reduction was successful in fully deallocating all pages from a physical resource the hypervisor could then further reduce energy consumption by invoking power control unit 203 to power down the deallocated resource. The hypervisor may cooperate with the operating systems running in the partitions by having the operating systems inform it as to their use of the physical page frames allocated to them. Based on the information provided by the operating systems, the hypervisor may be able to deallocate page frames, turning off memory modules when they become completely unused.

Figure 5:
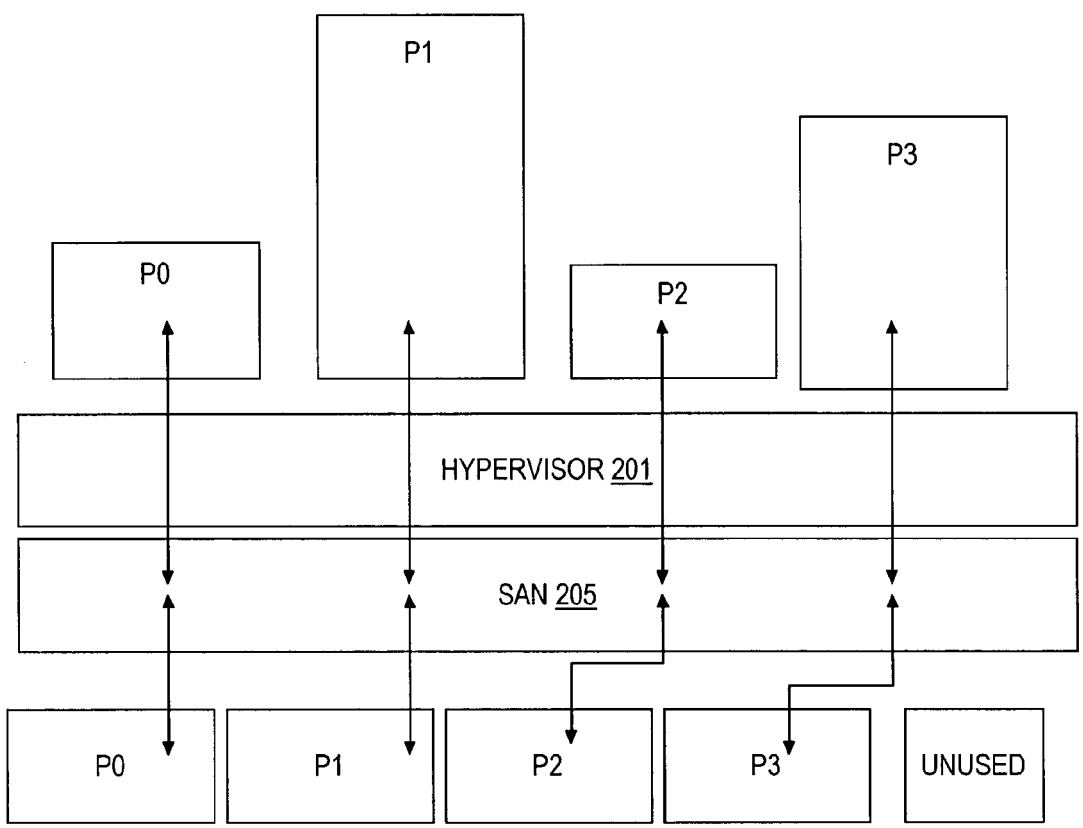
FIG. 5 illustrates an embodiment of a power-aware logically partitioned system according to the present invention employing a storage area network.

In one embodiment, the physical resources 220 may represent physical disk storage. In this embodiment, the physical resources could be implemented as a Storage Area Network (SAN) 205 as depicted in FIG. 5. In this embodiment, hypervisor 201 may be configured to convey partition information to SAN 205. SAN 205 may include its own processing, memory, and software resources sufficient to create logical partitions within SAN 205. In the depicted embodiment, the SAN 205 receives partition information from hypervisor 201 and creates "shadow" partitions within the SAN. For each hypervisor partition, SAN 205 thus creates a corresponding SAN partition where the disk resources allocated to the SAN partition reflect the disk storage needs of the corresponding hypervisor partition. The number of physical disks allocated to each SAN partition depends upon the level of redundancy required and other factors. Ultimately, however, the partition of SAN 205 may result in some portion of the physical disks being unallocated. In this case, the SAN 205 includes facilities to spin down the unallocated disk to conserve power.

It will be apparent to those skilled in the art having the benefit of this disclosure that the present invention contemplates system and methods for conserving power in a logically partitioned server environment. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system comprising:
   a set of physical resources;
   a hypervisor to create partitions within the system and allocate at least some of the physical resources to the partitions; and
   means for reducing power consumption of physical resources not allocated by the hypervisor;
   wherein the set of physical resources includes a set of memory modules and further wherein the means for reducing power consumption includes means for terminating power to memory modules that are not allocated by the hypervisor.

2. The system of claim 1, wherein the hypervisor allocates the physical resources to the partitions to maximize the physical resources that are not allocated.

3. The system of claim 1, wherein the set of physical resources includes a set of processors and further wherein the hypervisor allocates a fractional portion of at least one of the processors to at least one of the partitions.

4. The system of claim 3, wherein the means for reducing power consumption includes means for scaling a power supply voltage and a clocking frequency to the at least one fractionally allocated processor and means for turning off power to unallocated processors.

5. The system of claim 1, wherein the hypervisor includes means for dynamically de-allocating memory modules by paging selected physical page frames out to disk storage based on predetermined selection criteria.

6. The system of claim 1, wherein the predetermined selection criteria includes a frequency with which a physical page is accessed or information provided by the operating systems running within the partitions.

7. The system of claim 1, wherein the predetermined selection criteria is based on information provided by memory page information from operating systems running within the partitions.

8. The system of claim 1, wherein the set of physical resources includes a set of storage disks configured as a storage area network (SAN) connected to the data processing system and further wherein the means for reducing energy consumption includes means for logically partitioning the SAN to reflect the partitions of the data processing system and means for powering down disks not allocated to any of the SAN partitions.

9. A data processing system, comprising:
   a set of physical resources;
   means for creating partitions within the system, wherein each partition is configured to execute a corresponding operating system independently of the other partitions;
   means for allocating at least some of the physical resources to the partitions by packing the partitions into a minimum subset of the physical resources; and
   means for turning off physical resources not allocated to any of the partitions.

10. The system of claim 9, wherein packing the partitions includes allocating fractional partition portions of at least two of the partitions to a common physical resource.

11. The system of claim 10, wherein packing the partitions includes splitting a fractional partition portion between two different physical resources when the fractional partition portion exceeds the capacity of a first of the two physical resources.

12. The system of claim 9, wherein the set of physical resources comprises a set of processors and further wherein a fractional portion of at least one of the processors is allocated to at least one of the partitions.

13. The system of claim 12, further comprising reducing power consumption of at least one of the fractionally allocated processors by scaling its power supply voltage and clocking frequency and reducing power consumption of unallocated processors by turning off power to them.

14. The system of claim 9, wherein the set of physical resources comprises a set of memory modules and further wherein the system includes means for dynamically de-allocating a portion of the memory modules by paging selected physical page frames out to disk storage based on predetermined selection criteria.

15. A computer program product for use in allocating resources in a data processing system having physical resources including processors and memory modules, the computer program product comprising computer readable program code stored on a computer readable storage medium and including:
   code means for creating logical partitions within the system;
   code means for allocating a portion of the physical resources to the logical partitions by packing the logical partitions into a minimum subset of the physical resources; and
   code means for turning off a portion of the physical resources not allocated to any of the logical partitions.

16. The computer program product of claim 15, wherein packing the partitions includes code means for allocating fractional partition portions of at least two of the partitions to a common physical resource.

17. The computer program product of claim 16, wherein packing the partitions includes code means for splitting a fractional partition portion between two different physical resources when the fractional partition portion exceeds a capacity of a first of the two physical resources.

18. The computer program product of claim 15, wherein a fractional portion of at least one of the processors is allocated to at least one of the partitions.

19. The computer program product of claim 18, further comprising code means for reducing power consumption of at least one of the fractionally allocated processors by scaling its power supply voltage and clocking frequency and code means for turning off power to unallocated processors.

20. The computer program product of claim 15, wherein the system includes code means for dynamically de-allocating a portion of the memory modules by paging selected physical page frames out to disk storage based on predetermined selection criteria.

* * * * *